United States Patent Office 3,428,805
Patented Feb. 18, 1969

3,428,805
RADIO DIAGNOSTIC SCANNER WITH SEPARATELY MOVING SCINTILLATOR DETECTORS
Luigi Donato, Gianni Gennaro, and Roberto Giordani, Pisa, Italy, assignors to European Atomic Energy Community (Euratom), Brussels, Belgium, and Pisa, Italy
Filed Aug. 11, 1966, Ser. No. 571,892
Claims priority, application Italy, Aug. 17, 1965, 18,547/65
U.S. Cl. 250—71.5    8 Claims
Int. Cl. G01n 23/20; G01t 1/20; H01j 37/20

ABSTRACT OF THE DISCLOSURE

A radio diagnosis apparatus comprising at least three pairs of coaxially opposed scintillators. Each pair of scintillators is mounted with its axis parallel to that of the other pairs and is carried by an individual carriage. Automatically operated motion control means provide for synchronous movement of all carriages, as well as for individual control means for each carriage.

---

Figure 1:
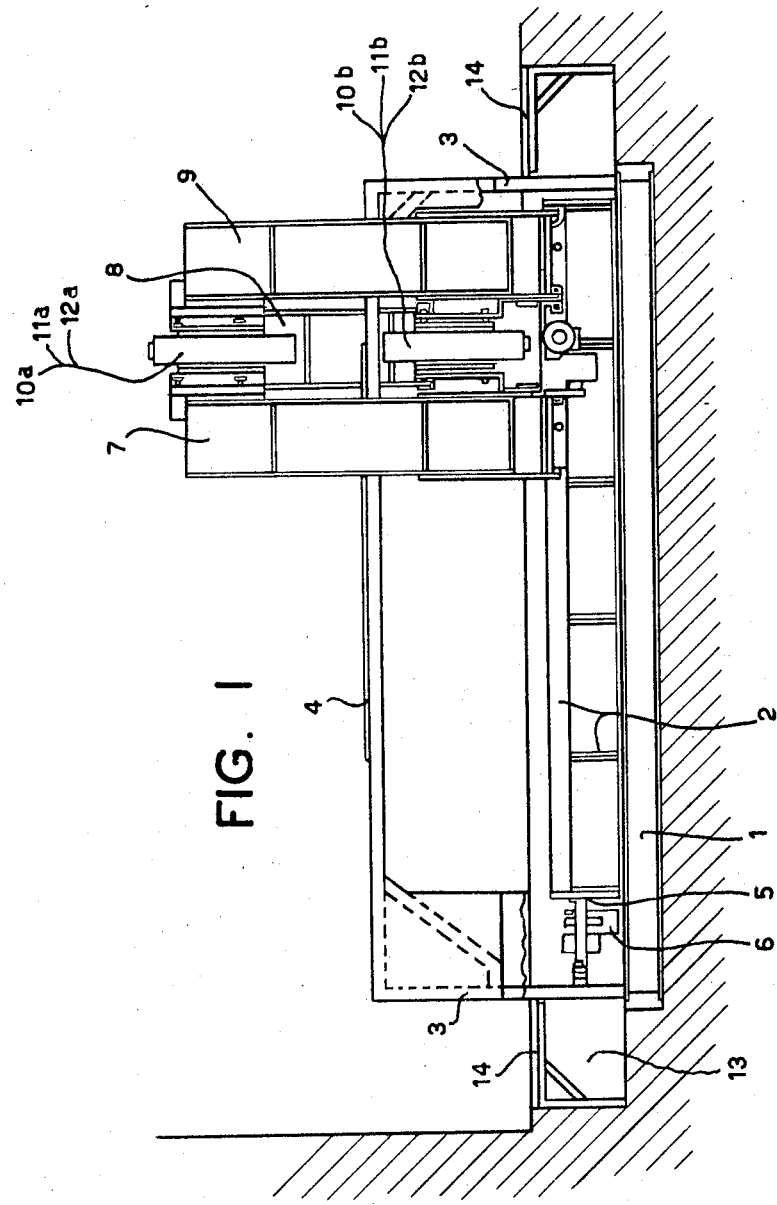

The invention relates to a universal body-scanner.

In radio diagnostic research and practical work, a large number of body-scanners are used; these have for the most part been developed for special requirements, such as body-scanning, zone-scanning and profile-scanning.

The forms of these measuring and investigating apparatuses are very varied.

Thus, it is known, for example, to dispose four counter-tubes with parallel axes on a quadrant circumference and to dispose a bed for the patient in an axially parallel relation and symmetrically to the counter-tube axes.

It is also known to dispose four counter-tubes at the same angular distances on the circumference of a circle so as to point to the center of the circle, and to dispose the bed perpendicularly to a diameter. One or two pairs of counter-tubes are also very often attached to a carriage movable longitudinally of the bed and disposed above it.

According to another fairly frequently used system, the patient to be examined is placed in a reclining chair, whose back, seat and leg rest are inclined at certain angles to one another, and the counter-tube is attached rotatably to a shaft parallel with all the reclining planes, so that the body is scanned along the longitudinal axis by rotating the shaft and counter-tube along its transverse axis.

In another system, the counter-tubes are disposed at the corners of a rectangular frame which is movably disposed along the two longitudinal edges of the bed.

In an apparatus of a different type, the counter-tube is disposed on the inside of a short cylinder fitted round the bed, this short cylinder being slidable longitudinally of the bed and the counter-tube assembly being able to travel round the inner wall of the short cylinder.

One of the most advanced apparatuses is a type in which the bed, together with the counter-tube suspension, is rotatably disposed about the mean transverse axis of the bed plane, arms projecting above and below the bed being disposed on longitudinal axes laterally above and below the bed plane, which arms are slidable along the two longitudinal shafts, which carry the counter-tubes at the arm ends and have links in the middle of the arms whereby the four arms can be bent in planes parallel with the bed, so that the pairs of counter-tubes can scan the bed plane longitudinally and transversely.

All these prior proposals have limited applications and it is an object of the present invention to provide an apparatus of more general application. Such apparatus would not only be able to produce comparable radio diagnostic results in a very wide field, but would also enable radio diagnosis to standardise its methods better, and enable it to be used more widely from a quantitative point of view.

Important disadvantages of the prior art apparatuses are that different apparatuses are used in each case for the different measuring methods, such as:

(a) body-scanning
(b) profile-scanning
(c) zone-scanning and, above all, different apparatuses, whose measurement geometrics differ widely from one another, have even been used for one and the same measuring process.

The universal body-scanner according to the invention remedies the absence of an apparatus that can be used universally in radio diagnosis.

The invention provides a body scanner for radio diagnosis which comprises a plurality of coaxially opposed scintillator or counter pairs, the axes of the pairs being in the same or parallel planes, a bed in a plane perpendicular to the plane or planes of the scintillator pairs, and in which the pairs are mounted on separate carriages movable along axes which are longitudinal and transverse with respect to the bed.

In a preferred form of the invention all three radio diagnostic processes, i.e. profile-scanning, zone-scanning and body-scanning, can be effected completely automatically with one and the same apparatus, this being done in the following way. Each scintillator pair together with its collimator pair is attached to a separate carriage, the carriages being movable along longitudinal and transverse axes with respect to the bed, and enabling the scintillator pairs to be juxtaposed on a transverse axis of the bed and co-ordinated three-point measurement to be effected at any three points of the bed plane, and the transverse and longitudinal movements of the carriages being programmable by specific means on the scanner.

Another preferred feature of the invention is that the movement of the carriages may be programmed so that the scintillator pairs, juxtaposed on a transverse axis of the bed, scan in co-ordination strips of the width of a collimator aperture longitudinally of the bed over the whole length of the bed, are shifted, when one length has been run through, by the width of the aperture in the direction of the transverse axis of the bed, scan over the whole length of the bed and in the opposite direction to the first scanning operation the strips that have been left out in that operation, and so on until the whole area of the bed has been scanned.

A feature of one form of the invention is that the movement of the scintillator pairs can be programmed so that automatic scanning can be carried out in any three partial zones of the measurement plane.

Another preferred feature of the body-scanner according to the invention is that it is equipped with a fully automatic measuring-point recording means as in applicants' copending patent application 571,928, filed Aug. 11, 1966, with P. Salvadori as a co-inventor.

Another preferred feature of the invention is the incorporation of a photoelectric system in the carriages and at bed height, which system may measure and record the thickness of the body layer being examined continuously and in coordination with the radio diagnostic measuring processes.

A convenient structural feature of the invention is the disposition of the several carriages on different levels of a three-level rail situated longitudinally of the whole apparatus, and an arrangement such that the carriages are moved mechanically, by running the carriages on a threaded spindle passing over the whole length of the apparatus, motors being disposed in each case at the end of this spindle and in the carriages, so that all the carriages can be moved simultaneously and in the same direction by operating the motor at the end of the threaded spindle, and the carriages can be moved individually by mutually independent operation of the motors in the various carriages.

Finally, another convenient feature of the invention is that the carriages are each moved along the transverse axis with respect to the bed by sliding on guides, by means of a threaded spindle with a motor.

Preferably the carriages are each composed of a top and a bottom part. In relation to the whole apparatus, the bottom part or bottom carriage can only be moved longitudinally. The top part rests on the bottom part and can be moved on it transversely of the whole apparatus.

Figure 2:
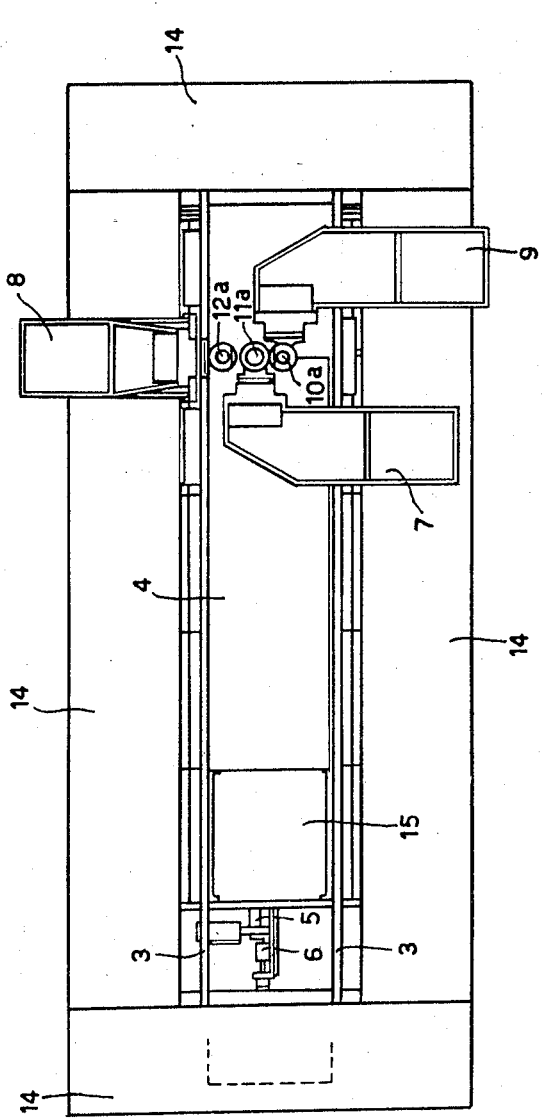
Figure 3:
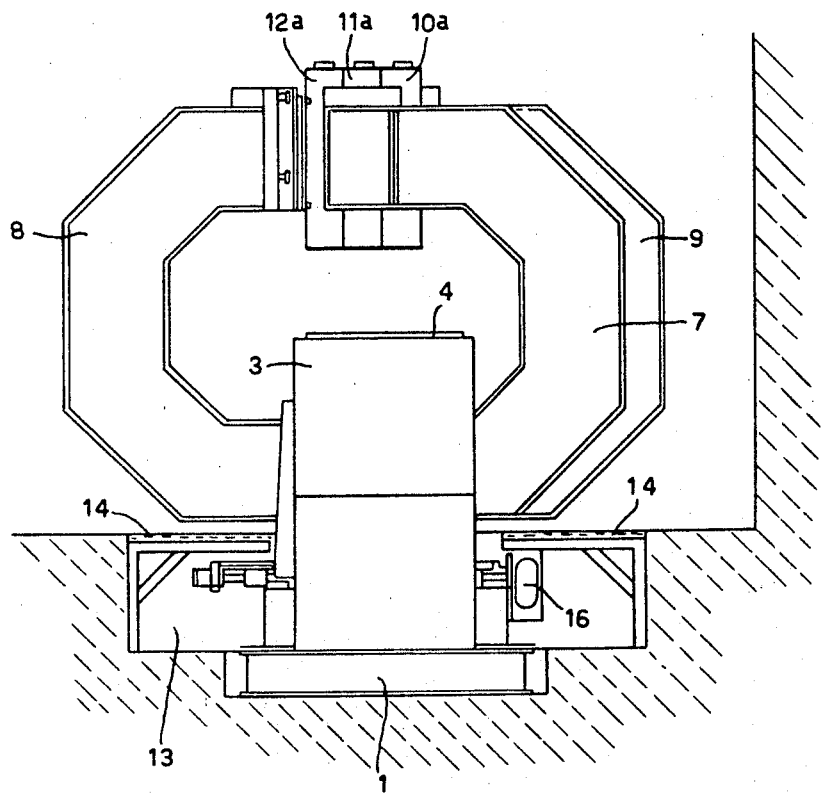
Figure 4:
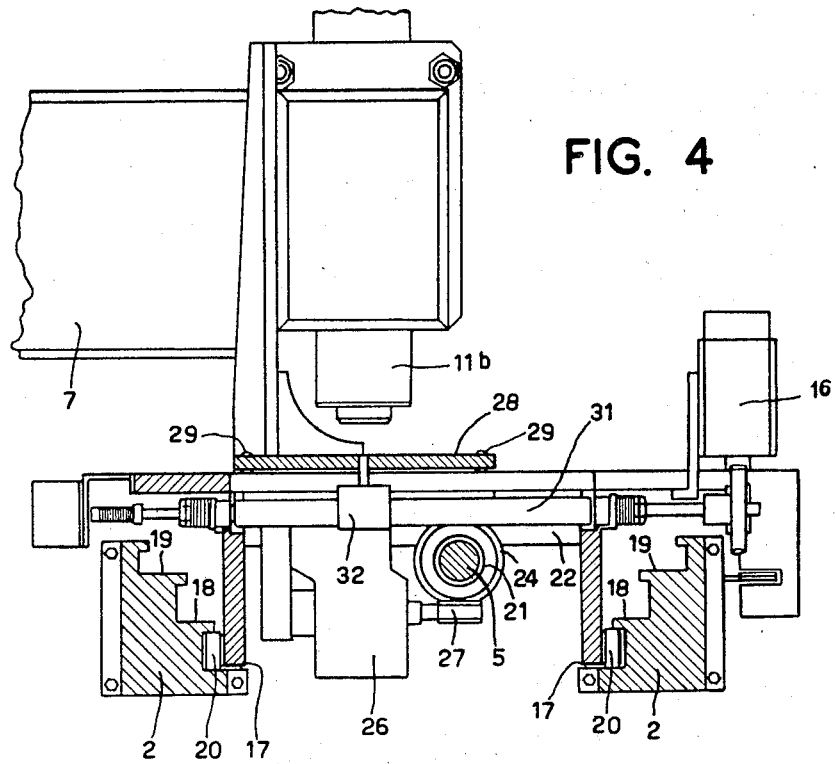
Figure 5:
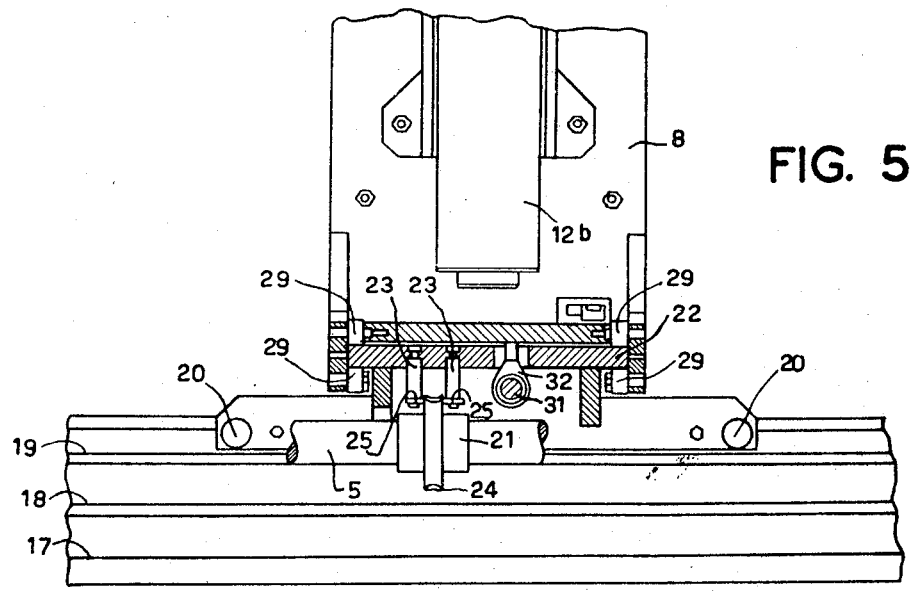
Figure 6:
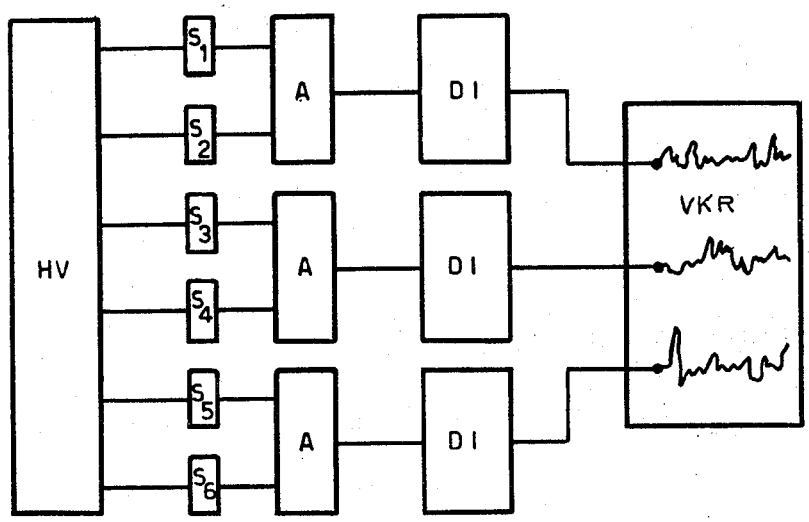

A specific embodiment of apparatus according to the invention and its use will now be described by way of example, with reference to the accompanying drawings, in which:

FIGURE 1 shows the apparatus in longitudinal section,
FIGURE 2 is a plan view,
FIGURE 3 is an end view,
FIGURE 4 is a cross-section through the base,
FIGURE 5 is a longitudinal section through the base, and
FIGURES 6 to 9 are diagrams illustrating uses of the apparatus.

In FIGURE 1, a pair of strong three-level rails 2 and a supporting frame 3 are mounted on a base 1; a bed 4 is disposed on the supporting frame 3, being mounted longitudinally slidably on rollers. A threaded spindle 5 is mounted longitudinally, intermediate between the three level rails 2; a motor 6, which can rotate the threaded spindle 5 engages with one end of the spindle. The carriages 7 and 8 and 9 are mounted on rollers and slide along the pair of three-level rails 2, which carriages also make screw-threaded engagement with the threaded spindle 5 at their bases, the carriages being movable longitudinally in co-ordination by the operation of the motor 6. The carriages 7 and 9 engage the screw from one side, and the carriage 8 from the other side of the bed, and each of them carries a top and bottom scintillation or countertube with a collimator 10a, 11a and 12a at the top, and 10b, 11b and 12b at the bottom which lie behind one another in alignment in FIGURE 1.

The base of the apparatus is received in a pit 13, which is covered round the apparatus with readily raisable flaps 14. The fitting of these flaps 14 is shown more clearly in FIGURE 2, in which the bed 4 can be pulled out as far as the dotted line on the suporting frame 3. This plan view also shows the carriages 7, 8 and 9 with the top scintillators and collimators 10a, 11a and 12a. The threaded spindle 5 in the base can be seen at its attachment to the motor 6 and is covered by a baseplate 15.

FIGURE 3 shows the base 1 being disposed in the bottom of the pit 13, which is covered by the flaps 14. The supporting frame 3 carries the bed 4 and the carriages 7, 8 and 9 carry the scintillator pairs 10, 11 and 12. The motors 16 serve for the transverse movements of the carriages.

FIGURE 4 shows the pair of three level rails 2, on whose different steps 17, 18 and 19 the carriages, with corresponding equipment, 7, 9 and 8 are placed. FIGURE 4 is therefore a cross-section through the base of the carriage 7, and FIGURE 5 a longitudinal section through the base of the carriage 8. As seen in FIGURE 4, the carriage 7 is mounted on rollers 20. A nut 21 engages on the thread of the threaded spindle 5 and is adjustably connected to the mount 22 by means of the two coupling pieces 23 in FIGURE 5. A toothed ring, which is rigidly connected with the nut 21, is disposed on the nut 21 as seen in FIGURES 4 and 5. The bottom ends of the two coupling pieces 23 in FIGURE 5 carry rollers 25, which run on the faces of the toothed ring 24. Actuating the motor 26 in FIGURE 4, which is rigidly attached to the mount 22, rotates the nut 21 with the toothed ring gear 24 via a short threaded spindle and worm 27, whereupon the carriages 7, 8 and 9 may be moved individually, running on the rollers 20 in a longitudinal direction by running along the thread of the spindle 5, by means of the nuts 21. The base of each carriage has a motor 26 for longitudinal movement. The carriages are independently movable transversely by sliding the base 28 of each carriage (see FIGURE 4) on rollers 29, the drive coming from a motor 16 via a rotatably mounted spindle 31, on which an internally threaded nut 32 engages, which nut is rigidly connected to the base 28, and thus carries the carriage 7 with it transversely to the whole apparatus as seen in FIGURE 4.

In FIGURE 5, the transverse threaded spindle 31 with its nut 32 can be seen in cross-section. In this figure, the different levels 17, 18, 19 on which the carriage mounts are placed are also shown. The carriage 8 in FIGURE 5 is mounted by pairs of rollers 29 running on the mount 22 above and below the mount.

For the use of the apparatus according to the invention, three basic measurement principles may be used; these are dealt with below:

(a) Simultaneous measurement at three different places on the body. In this case, the three scintillator and collimator pairs are each fixed in a determined position.

An advantage of the apparatus according to the invention in this case is than an isoefficiency count can be taken within a given volume. The electronic arrangement for measurements in which the collimator pairs are fixed in determined positions are sketched in FIGURE 6. Each scintillator pair $S_1+S_2$, $S_3+S_4$, $S_5+S_6$ is fed by a single current source HV and delivers the pulses to an analyser A, whence the pulses pass to a digital integrator DI and a multi-channel recorder VKR. The digital integrators, which may also be used as scale indicators, enable very rapid activity changes to be followed without the occurrence of damping.

Figure 7:
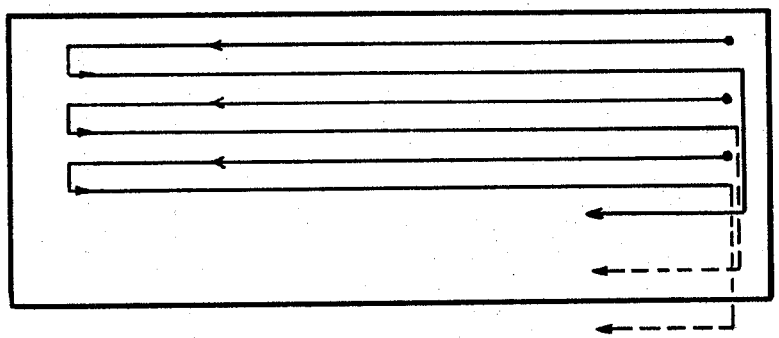
Figure 8:
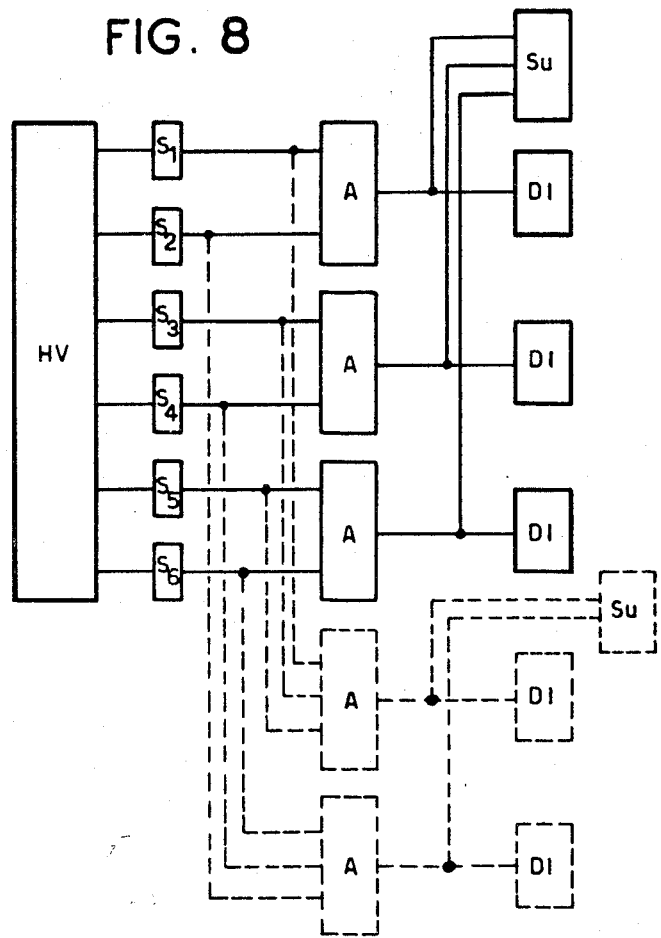

(b) With profile-scanning, the transversely aligned scintillator pairs carry out the movement indicated in FIGURE 7 and thus scan the whole bed plane. The transverse movement can be varied appropriately and is always equal to the collimator aperture. FIGURE 8 shows the electronic arrangements for measurements for this type of examination.

The three measurement leads also lead in this case to a summator $Su$ which integrates the body activity. It is also possible in this case to connect the three top scintillators separately from the bottom ones, so as to determine whether there is a higher concentration of radioactivity in the top or bottom half of the reclining body.

Figure 9:
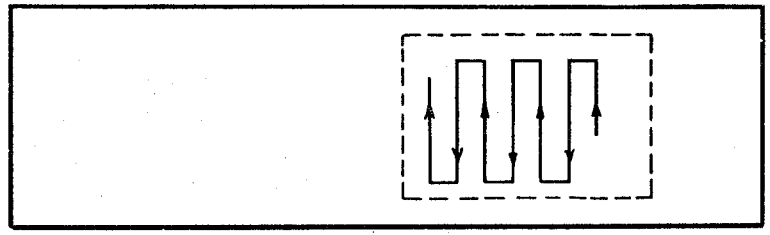

(c) The third way in which the apparatus may be used is for zone-scanning, the movement carried out in this case being shown in FIGURE 9. Here only one scintillator pair is used for measurement, and the longitudinal advance may likewise be varied according to the collimator aperture. The electronic arrangements for measurement are then simplified to only one channel of FIGURE 6.

The apparatus is also equipped with a novel device for the representation of measurement data.

In addition, a carriage at bed height may incorporate photoelectric cells which measure the thickness of the body layer examined and thus make it possible to ascertain a specific body activity related to the body-layer thickness.

We claim:
1. A radio diagnosis apparatus comprising at least three pairs of coaxially opposed scintillators with the axes of the pairs being parallel to one another, at least three carriages each having one of said scintillator pairs mounted thereon, a bed in a plane perpendicular to the axes of said pairs, means for moving said carriages both simultaneously and separately in the longitudinal and transverse directions with respect to said bed thereby enabling said pairs to be juxtaposed on an axis of the bed and to effect coordinated three-point measurement.

2. A radio diagnosis apparatus according to claim 1 wherein said means for moving said carriages includes automatically operated binary instruction means.

3. A radio diagnosis apparatus according to claim 1 further comprises a scanner including programmable means to control the movement of said carriages.

4. A radio diagnosis apparatus according to claim 1 wherein said means for moving said carriages comprises a motor having a driven threaded spindle with at least three screws thereon, means on each of said carriages for engaging with one of said screws to be driven into motion thereby.

5. A radio diagnosis apparatus according to claim 1 wherein said means for moving said carriages causes them to move so that the scintillators scan coordinated strips of the longitudinal length of the bed in one direction, shifts said scintillators transversely and moves in the opposite direction successively whereby the entire bed will be scanned.

6. A radio diagnosis apparatus according to claim 1 wherein said means for moving said carriages causes them to move so that said scintillators scan three partial zones of said bed.

7. A radio diagnosis apparatus according to claim 1 wherein said means to move the carriages comprises a pair of parallel rails mounted longitudinally of said bed, said rails having at least three levels with one carriage mounted on each level, a motor disposed at one end of said apparatus and having a threaded spindle extending the length of said apparatus parallel to said rails, means on each of said carriages for selectively engaging said spindle to be driven thereby to effect individual and coordinated movement of said carriages.

8. A radio diagnosis apparatus according to claim 7 wherein each said carriage further comprises guide means extending along the transverse axis of said bed and including motor driven threaded spindle means for selectively moving said scintillator pair transversely of said bed.

References Cited

UNITED STATES PATENTS 3,233,102   2/1966   Packard.

OTHER REFERENCES

Morris: A Linear Scanner for Human Radioisotope Research, Aug. 22, 1960, U.S. Atomic Energy Commission. AT-40-1-Gen-33, p.1-8 and 23-25.

RALPH G. NILSON, *Primary Examiner.*

M. J. FROME, *Assistant Examiner.*

U.S. Cl. X.R

250—52